UNITED STATES PATENT OFFICE.

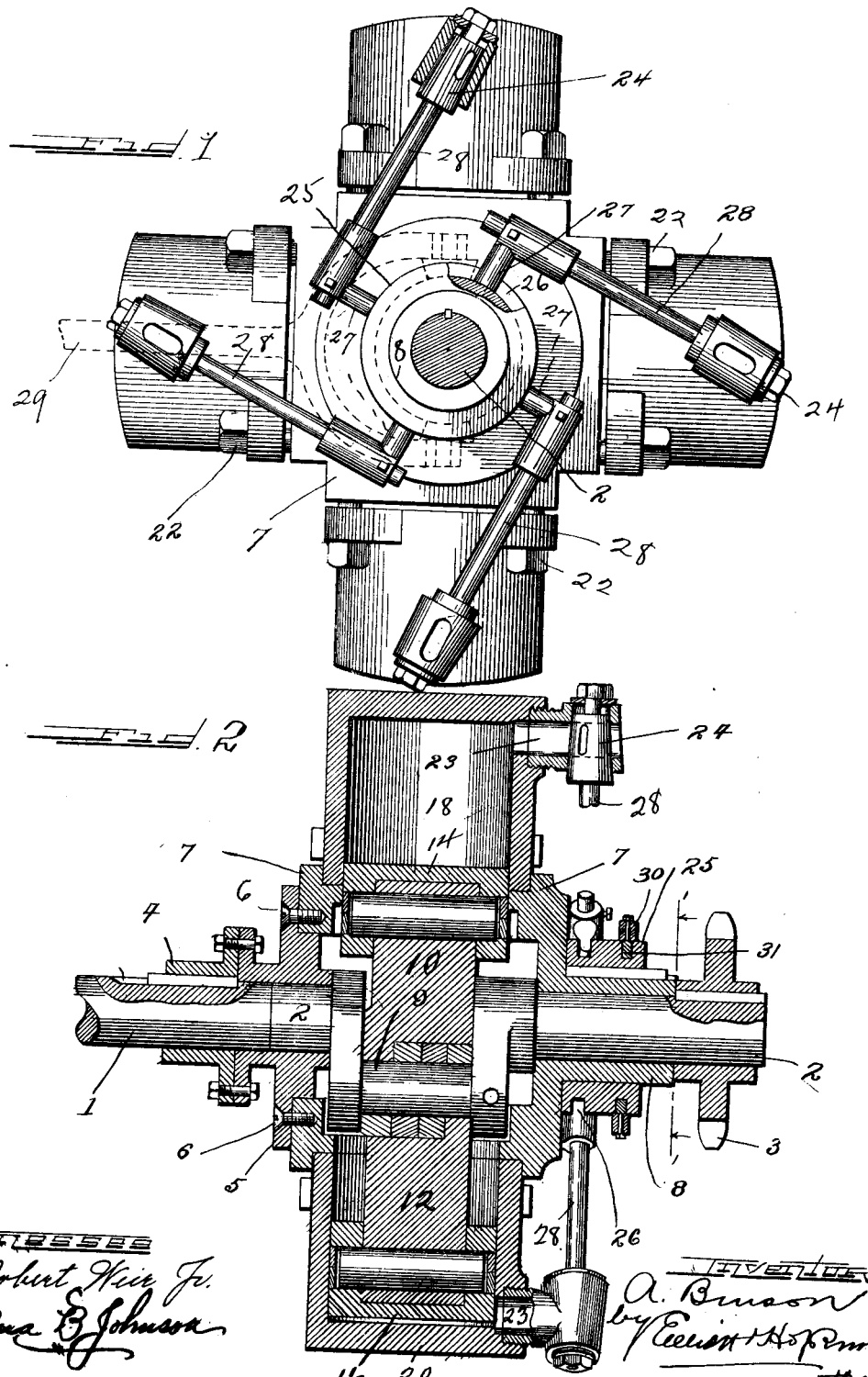

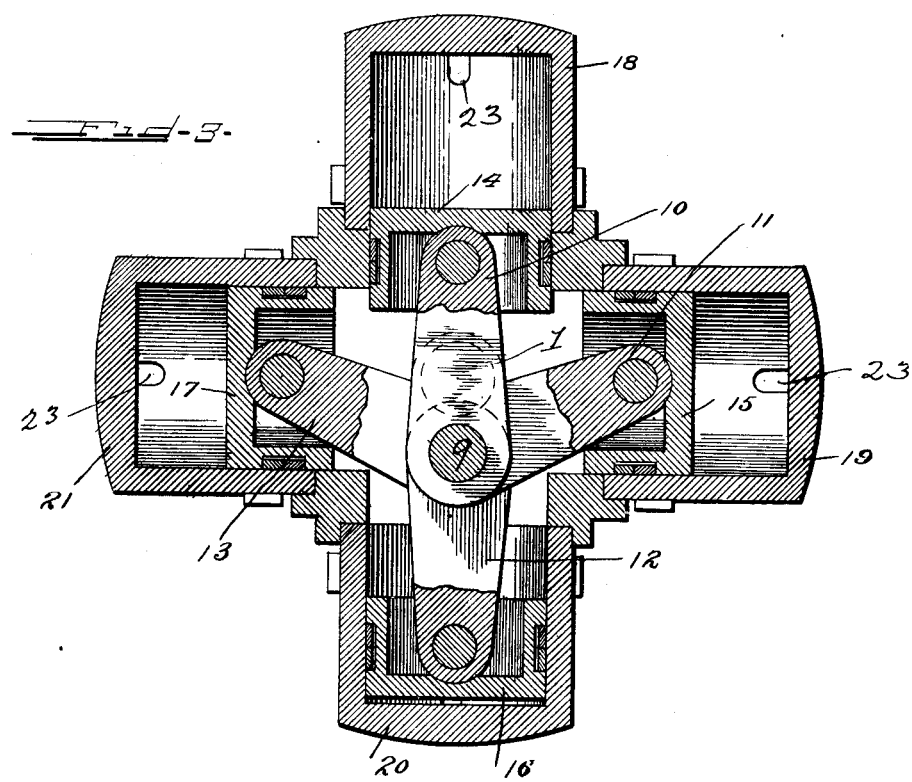

ANDREW BENSON, OF CHICAGO, ILLINOIS, ASSIGNOR OF ONE-HALF TO JOHN P. PRICE AND ROBERT P. PRICE, OF SAME PLACE.

POWER-TRANSMITTER.

SPECIFICATION forming part of Letters Patent No. 675,849, dated June 4, 1901.

Application filed January 31, 1901. Serial No. 45,410. (No model.)

*To all whom it may concern:*

Be it known that I, ANDREW BENSON, a citizen of the United States, residing at Chicago, in the county of Cook and State of Illinois, have invented certain new and useful Improvements in Power-Transmitters, of which the following is a full, clear, and exact specification.

My invention relates to that class of power-transmitters designed for the purpose of transmitting to a driven shaft or member at will a greater or less proportion of the power of a uniformly-driven power shaft or member without causing clash or shock, and it has more especial reference to that class in which the power is transmitted through the medium of a fluid; and my invention has for its primary object to provide improved means whereby air may be employed as such fluid, and thus avoid sudden shock due to the use of non-compressible fluids, such as water and other liquids, and also avoid all difficulty arising from undue resistance to free relative movement of the parts at a time when no resistance is desired.

With this end in view my invention consists in certain features of novelty in the construction, combination, and arrangement of parts by which the said object and certain other objects hereinafter appearing are explained, all as clearly described with reference to the accompanying drawings and more fully pointed out in the claims.

In the said drawings, Figure 1 is a side elevation of my improved power-transmitter. Fig. 2 is a section taken lengthwise of the longitudinal axis thereof. Fig. 3 is a section taken at right angles to the plane of the aforesaid section.

1 represents a driving shaft or member, and 2 is a driven shaft or member, from which the power or motion may be transmitted to the wheels of a vehicle or to any other part, as desired, from a sprocket 3, secured thereon, or by any other desired means. In the example of my invention shown in the drawings the power-transmitter consists of a shell or casing having one or more air-chambers and a corresponding number of air-displacing members or pistons acting within said chambers, respectively, in such a manner as to force air out of one and draw air into another, said pistons being connected to a crank or other suitable member, which will cause a relative reciprocating movement of the pistons with the cylinders or air-chambers if the driven shaft is rotated relatively to the driving-shaft, and the closed ends of these air chambers or cylinders are provided with means whereby the escape of air from one cylinder and the inlet of air to another cylinder may be prevented. It is evident, therefore, that the driving and driven members must be connected one with the casing or cylinders and the other with the pistons; but it is immaterial which. In the accompanying drawings I have shown the driving-shaft 1 connected with the casing. This is accomplished by keying to the shaft a coupling member 4, which is secured to another coupling member 5, and this latter is secured by bolts or screws 6 to the central member 7 of the casing. The coupling member 5 constitutes a bearing for one end of the shaft 2, while the other side of the central member 7 of the casing is provided with a bearing 8 for the outer end of the shaft 2. Secured to or formed on the shaft 2 within the central member 7 of the casing is a crank 9, and to this crank are pivoted four pitmen 10, 11, 12, and 13, to whose outer ends are respectively pivoted four pistons 14, 15, 16, and 17, which work in cylinders 18 19 20 21, respectively, as better shown in Fig. 3, said cylinders being secured to the central member 7 by bolts or screws 22. Thus it will be seen that when the cylinders are revolved by the shaft 2 the pistons will undergo a relative reciprocal movement in their respective cylinders without rotating the shaft 2, providing there be no opposition to this relative movement of piston and cylinder. Hence it is obvious that the motion and power imparted to the shaft 2 from the shaft 1 may be made proportional to the resistance interposed between the pistons and their respective cylinder-heads or to any other resistance to this relative movement of the pistons. As before explained, I create this resistance by interposing air between the piston and cylinder-head, and thus compelling the piston to compress the air or carry the crank 9 around with more or less speed, according to the resistance of the air; but in practice I prefer to supplement this resistance by more or less excluding the air from the cylinders, thus resisting the relative movement of the piston by suction, whereby the piston in one cylinder will be resisted by the compressed air within the cylinder and in another cylinder will be resisted by the atmospheric pressure tending to force it toward the cylinder-head. In order to accomplish this resistance from simultaneous compression and suction, it is simply necessary to have the cylinders disconnected from each other and to close them more or less at their outer ends, according to the resistance required, so that the air trapped in one cannot get out and the atmospheric air cannot get into the other to relieve the vacuum. For accomplishing this I have shown each of the cylinders provided in its outer end or adjacent to its head with an air-port 23, which communicates directly with the atmosphere when not shut off by a valve-plug 24, arranged therein. All of these valve-plugs are operated simultaneously by any suitable means, such as a collar 25, splined on the bearing 8 and having a groove 26, in which engage a number of arms 27, secured to stems 28, connected with the valve-plugs 24, respectively, so that when the collar 25 is reciprocated on the bearing 8 the valve-plugs will be opened or closed to a greater or less degree. This collar 25 may be given the described movements by any suitable means, such as a lever 29, having a forked end 30, provided with studs 31, running in another groove in the collar, in a well-known manner.

Assuming the parts to be in the position shown in Fig. 3 and all of the valves 24 closed, it will be seen that the air trapped within the cylinders 18 19 will resist the outward or compressing movements of the pistons 14 15, respectively, while the vacuum, or, more properly speaking, the atmospheric pressure, will resist the return or inward movements of pistons 16 17 in cylinders 20 21, thus locking all of the pistons against relative movement or movement relative to the casing by the combined resistance of the air compressed in the cylinders and the atmospheric pressure, and thereby causing the crank to revolve as one with the driving-shaft.

Having thus described my invention, what I claim as new therein, and desire to secure by Letters Patent, is—

1. In a power-transmitter the combination of a chamber having an air-port, means for varying the capacity of said port, a movable air-displacing member acting within said chamber and driving and driven members operatively connected, one with said chamber and the other with said displacing member, substantially as set forth.

2. In a power-transmitter the combination of a chamber having an air-port, means for varying the capacity of said port, a movable air-displacing member acting within said chamber, driving and driven members one of which is operatively connected with said chamber and a crank connecting the other with said displacing member, substantially as set forth.

3. In a power-transmitter the combination of a chamber having an air-port, means for varying the capacity of said port, an air-displacing member movable toward and from said port for displacing therethrough the air in said chamber, and driving and driven members operatively connected one with said chamber and the other with said displacing member, substantially as set forth.

4. In a power-transmitter the combination of a driving member and a driven member, a member movable with one of said members and also capable of a relative movement thereto and means connected with the other of said first two members for resisting said relative movement by the combined force of the atmospheric pressure and air compression, substantially as set forth.

5. In a power-transmitter the combination of a driving member and a driven member, a plurality of air-displacing members operatively connected with one of said members and movable relatively thereto and means for resisting said relative movement at will by the combined force of the atmospheric pressure and compressed air acting respectively against said displacing members, substantially as set forth.

6. In a power-transmitter the combination of a plurality of air-chambers having air-ports, a corresponding number of air-displacing members acting in said chambers, means for preventing the escape of air from one and the inlet of air to another of said chambers, and driving and driven members connected one to said displacing members and the other to said chambers, substantially as set forth.

7. In a power-transmitter the combination of a plurality of cylinders disconnected from each other and each having an air-port, means for simultaneously controlling the passage of air through said ports, pistons working in said cylinders respectively, and driving and driven members operatively connected one with said cylinders and the other with said pistons, substantially as set forth.

8. In a power-transmitter the combination of a plurality of disconnected cylinders each having one end closed save for an air-port, a piston arranged in each of said cylinders and adapted to move toward said closed end and port, means for simultaneously controlling the passage of air through said ports and driving and driven members operatively connected one with said piston and the other with said cylinders, substantially as set forth.

ANDREW BENSON.

Witnesses:
EDNA B. JOHNSON,
F. A. HOPKINS.